United States Patent
Chou et al.

(10) Patent No.: US 10,017,897 B1
(45) Date of Patent: Jul. 10, 2018

(54) METHOD OF ENHANCING EFFICIENCY OF CARBON FELTS IN FLOW BATTERY THROUGH SONICATION

(71) Applicant: Institute of Nuclear Energy Research, Atomic Energy Council, Executive Yuan, R.O.C., Taoyuan (TW)

(72) Inventors: Yi-Sin Chou, New Taipei (TW); Heng-Wei Chiang, Taoyuan (TW); Chao-Yen Kuo, Taoyuan (TW); Ning-Yih Hsu, Keelung (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 74 days.

(21) Appl. No.: 15/396,897

(22) Filed: Jan. 3, 2017

(51) Int. Cl.
| | |
|---|---|
| *H01M 8/18* | (2006.01) |
| *D06M 10/02* | (2006.01) |
| *H01M 4/96* | (2006.01) |
| *D06M 11/55* | (2006.01) |
| *D06M 11/65* | (2006.01) |
| *D06M 101/40* | (2006.01) |

(52) U.S. Cl.
CPC ............ *D06M 10/02* (2013.01); *D06M 11/55* (2013.01); *D06M 11/65* (2013.01); *H01M 4/96* (2013.01); *H01M 8/188* (2013.01); *D06M 2101/40* (2013.01); *D06M 2400/01* (2013.01)

(58) Field of Classification Search
CPC ...................................................... H01M 8/18
See application file for complete search history.

(56) References Cited

FOREIGN PATENT DOCUMENTS

KR 1020140041057 * 10/2015

* cited by examiner

*Primary Examiner* — Jacob Marks
(74) *Attorney, Agent, or Firm* — Jackson IPG PLLC; Demian K. Jackson

(57) ABSTRACT

A method is provided to enhance efficiency of carbon felts in a flow battery. The carbon felts are directly immersed in a mixed acid solution. The carbon felts with the solution are heated at a low temperature and processed through sonication. On surface defects of the carbon felts, —OH and C═O functional groups are efficiently generated. The functional groups catalyze the redox reaction of vanadium ions. More active positions are obtained on the carbon felts through the activation treatment. Both of valence exchange and redox velocity of the vanadium ions are enhanced. Thus, the present invention has simple and fast processes with easily regulated experimental parameters for good modification without high temperature treatment but low cost.

5 Claims, 5 Drawing Sheets

METHOD OF ENHANCING EFFICIENCY OF CARBON FELTS IN FLOW BATTERY THROUGH SONICATION

TECHNICAL FIELD OF THE INVENTION

The present invention relates to carbon felt; more particularly, relates to directly immersing carbon felts in a mixed acid solution to be heated at a low temperature and processed through sonication, where —OH and C=O functional groups are efficiently generated on surface defects of the carbon felts during modification.

DESCRIPTION OF THE RELATED ARTS

Electrochemical flow battery, also known as redox flow battery, is an electrochemical energy storage device. Therein, those which use vanadium salt solution for positive and negative electrodes are called vanadium redox flow battery. The vanadium redox flow battery is ideal as a green-energy storage device because it has excellent charge and discharge performance, low cost and long life and its manufacture, use and dispose do not generate harmful material.

A general flow of its electrochemical reactions is shown in FIG. 5, where a three-electrode configuration is used for redox reaction with voltage conducted, comprising the following steps:

(1) Step 51: An unmodified carbon felt is obtained as a negative electrode; a titanium plate (or a graphite plate) is obtained as a positive electrode; a solution of 1 mole (M) sulfuric acid is obtained as an electrolyte; and a voltage or a current is conducted for processing electrochemical oxidation.

(2) Step 52: The reactions are processed for a few minutes to an hour.

(3) Step 53: After processing washing with deionized water, vacuum drying is processed at a temperature of 120 celsius degrees (° C.) for 5 hours.

(4) Step 54: The electrodes are used for assembling a cell stack of the flow battery.

(5) Step 55: A new solution is pumped into the flow battery, where the solution contains 1M to 3M of vanadyl sulfate and 1M to 5M of sulfuric acid (or hydrochloric acid or nitric acid or phosphoric acid.) The solution flows in through an anode inlet and a cathode inlet to be uniformly in contact with the unmodified carbon felt at a flow rate controlled between 20 and 100 milliliters per minute (mL/min). The solution flows out through an anode outlet and a cathode outlet to be collected with electrolyte containers. Then, the solution flows back to the cell stack through the anode inlet and the cathode inlet to be recycled repeatedly until air in the cell stack is completely expelled out.

(6) Step 56: The positive and negative electrodes are connected with an external power supply to conduct a current in a constant-current mode for charging the cell stack through repeated charging and discharging operations.

However, the prior art uses the noble metal titanium, whose cost is high. A long time (about 6 hours) is required to process the above step 51 to step 53 for obtaining a single cell. If 10 pieces of single cells are used for assembling the cell stack, the above steps need to be repeated for 10 times—it is time-consuming. Because this method is used for single cell only, each single cell obtained through the repeated procedure may be inconsistent owing to external environment and the procedure is too complicated to be effectively commercialized. In addition, the carbon felts used in this traditional electrochemical oxidation method can not be fully in contact with the electrolyte. Hydrogen and oxygen bubbles may be generated as byproducts on surfaces of the electrodes made of the carbon felts when they are immersed in the electrolyte. Because the carbon felts are porous, there will be some areas that are not uniformly in contact with the electrolyte for processing the electrochemical reaction and, therefore, efficiency of the flow battery can not be effectively improved. Moreover, the traditional acid treatment method needs to set up equipments for heating, refluxing and condensing; the reaction time may take up to several hours or more; the procedure is complicated and needs to be operated at a high temperature and a high pressure; and, the energy consumption required for production is relatively high.

Besides, the traditional method of electrochemical oxidation for modifying carbon felts uses three-electrode configuration, where voltage is conducted for processing redox reaction to form functional groups on surfaces of the carbon felts. After the modification of the carbon felts is completed, a flow battery is assembled with the modified carbon felts followed by charging and discharging operations of the battery. The traditional electrochemical oxidation method can not make the carbon felts sufficiently and fully in contact with the electrolyte. It is because that, when the carbon felts are immersed in the electrolyte, side reactions of the electrolyte may happen to generate hydrogen and oxygen bubbles on surfaces of the electrodes. Because the carbon felts are porous, there will be some areas that are not uniformly in contact with the electrolyte for processing the electrochemical reaction and, therefore, efficiency of the flow battery can not be effectively improved. Another electrochemical oxidation method directly puts carbon felts in a flow battery. A voltage is conducted through a mixed acid solution to modify the carbon felts. After the modification is finished, the mixed acid solution is replaced by a vanadium electrolyte to obtain a vanadium flow battery. Thus, the electrochemical oxidation method for directly modifying the carbon felts is simple, but extra power is required while graphite plates may be easily worn out. Sonication is another method for modifying carbon felts. After the carbon felts is modified through sonication at first, a flow battery is assembled with the modified carbon felts. Although the procedure is a little complicated, the carbon felts are sufficiently and fully in contact with the electrolyte to obtain a better performance. Under a current density of 80 milliamperes per square centimeters ($mA/cm^2$), cycles of charging and discharging a single cell of flow battery with carbon felts modified through the above two methods are processed. The charging and discharging operations using the carbon felts modified through sonication has an energy efficiency of 80%; and, those using the carbon felts modified through electrochemical oxidation has an energy efficiency of 70% only.

Hence, the prior arts do not fulfill all users' requests on actual use.

SUMMARY OF THE INVENTION

The main purpose of the present invention is to directly immerse carbon felts in a mixed acid solution to be heated at a low temperature and processed through sonication, where —OH and C=O functional groups are efficiently generated on surface defects of the carbon felts during modification.

Another purpose of the present invention is to obtain simple and fast processes with easily regulated experimental parameters for good modification without high temperature treatment but with low cost.

Another purpose of the present invention is to increase efficiencies (coulomb efficiency, energy efficiency and voltage efficiency) of a flow battery by modifying carbon felts through sonication.

To achieve the above purposes, the present invention is a method of enhancing efficiency of carbon felts in a flow battery through sonication, comprising steps of: (a) immersing a plurality of carbon felts in a mixed acid solution; processing heating and sonication; and, then, washing the carbon felts with ultrapure water and drying the carbon felts; (b) obtaining the carbon felts after being processed with the sonication to be made into a positive electrode and a negative electrode; and assembling a cell stack with the positive electrode and the negative electrode; (c) filling an electrolyte into the cell stack by two pumps, the electrolyte comprising 1 mole (M) to 3M of vanadyl sulfate and an aqueous solution of 1M to 5M of inorganic acid; under a flow rate controlled between 20 and 100 milliliters per minute (mL/min), flowing the electrolyte through an anode inlet and a cathode inlet to be uniformly in contact with the positive electrode and the negative electrode which are made of the carbon felts; flowing the electrolyte through an anode outlet and a cathode outlet and the anode inlet and the cathode inlet to be collected in a positive electrolyte container and a negative electrolyte container; recycling the electrolyte to be pumped into the cell stack again through the anode inlet and the cathode inlet until air in the cell stack is completely expelled; and (d) connecting an external power supply to the positive electrode and the negative electrode; conducting a current of 1~2 amperes (A) under a constant-current mode with a cut-off voltage of 1.6 volts (V); processing charging and discharging operations in the cell stack; and repeating the charging and discharging operations until charge ends. Accordingly, a novel method of enhancing efficiency of carbon felts in a flow battery through sonication is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1~FIG. 4, which are a flow view showing a preferred embodiment according to the present invention; a structural view showing a cell stack; a view showing an architecture using the cell stack; and a SEM view showing surfaces of the carbon felts. As shown in the figures, the present invention is a method of enhancing efficiency of carbon felts in a flow battery through sonication, comprising the following steps:

(a) Fabricating carbon felts 11: A plurality of carbon felts (5 centimeters (cm)×5 cm) are immersed into a mixed acid solution of sulfuric acid and nitric acid. The solution is heated to 55~85 celsius degrees (° C.) and sonication is processed for 10~90 minutes (min). Then, the carbon felts are washed with ultrapure water and dried. Therein, the mixed acid solution has a volume ratio of 3:1 of sulfuric acid to nitric acid.

Figure 1:
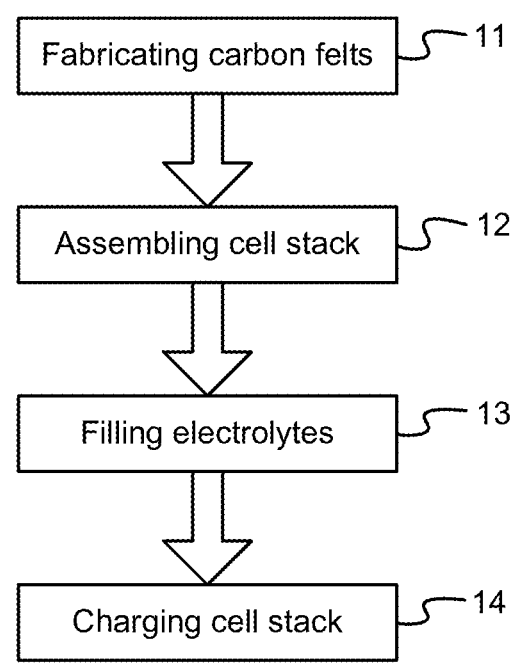
FIG. 1 is the flow view showing the preferred embodiment according to the present invention.
Figure 2:
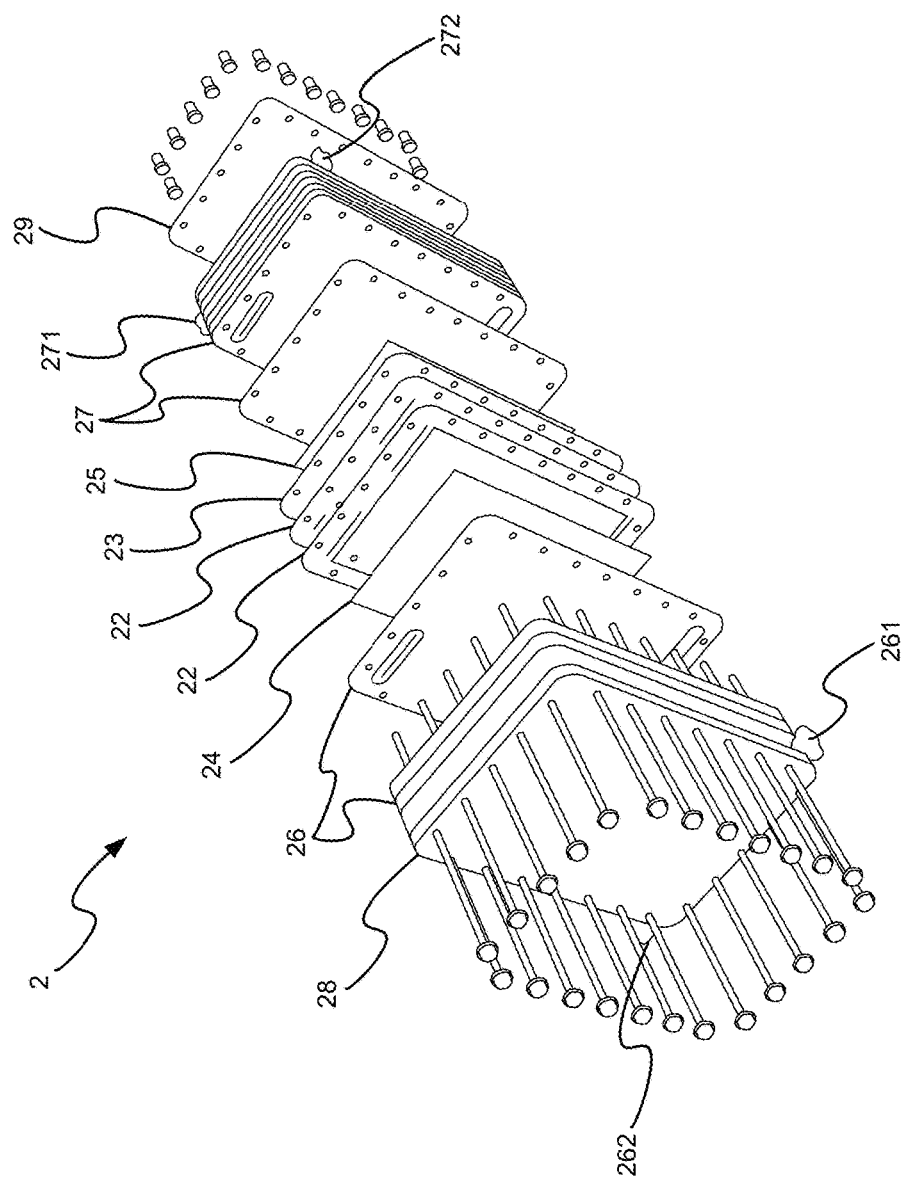
FIG. 2 is the structural view showing the cell stack.
Figure 3:
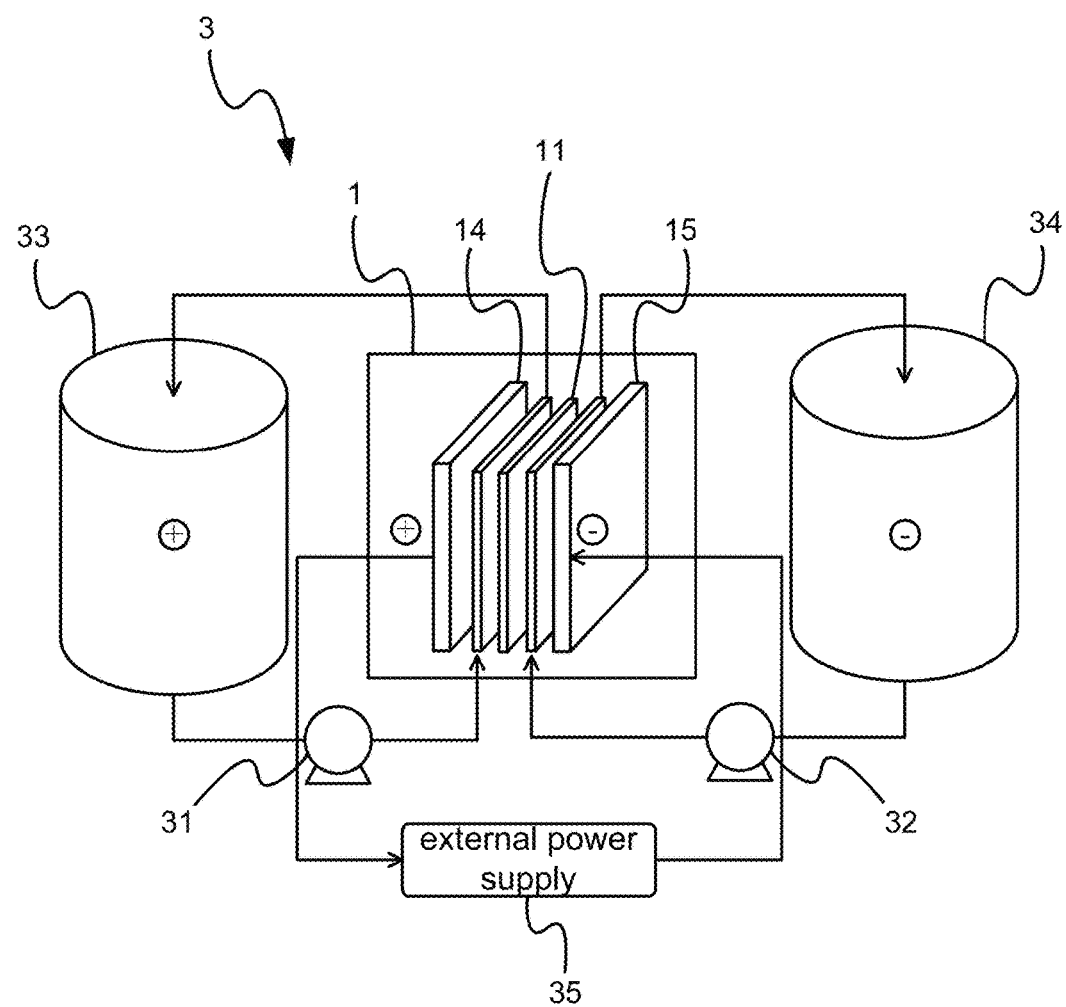
FIG. 3 is the view showing the architecture using the cell stack.

(b) Assembling cell stack 12: The carbon felts obtained after being processed through the sonication is made into a plurality of electrodes; and a cell stack is assembled with the electrodes. As shown in FIG. 2, the cell stack 2 comprises a proton exchange membrane 21, two gaskets 22,23, two electrodes 24,25, two flow plates 26,27 and two end plates 28,29. Therein, the two gaskets 22,23 clips the proton exchange membrane 21; the two electrodes 24,25 clips the two gaskets 22,23; the two electrodes 24,25 are a positive electrode 24 and a negative electrode 25; the two electrodes 24,25 are made of the carbon felts; the two flow plate 26,27 clips the two electrodes 24,25; one of the two flow plates 26 has an anode inlet 261 and a cathode inlet 262; another one of the two flow plates 27 have an anode outlet 271 and a cathode outlet 272; and, the two end plates 28,29 clips the two flow plates.

(c) Filling electrolyte 13: An electrolyte is filled into the cell stack by two pumps 31,32, where the electrolyte comprise 1 mole (M) to 3M of vanadyl sulfate and an aqueous solution of 1M to 5M of inorganic acid. Under a flow rate controlled between 20 and 100 milliliters per minute (mL/min), the electrolyte is flown through the anode inlet 261 and the cathode inlet 262 to be uniformly in contact with the carbon felts (i.e. the positive electrode 24 and the negative electrode 25). The electrolyte flows through an anode outlet 271 and a cathode outlet 272 along with the anode inlet 261 and the cathode inlet 262 to be collected in a positive electrolyte container 33 and a negative electrolyte container 34. The electrolyte is recycled to be pumped into the cell stack 2 again through the anode inlet 261 and the cathode inlet 262 until air in the cell stack 2 is completely expelled. Therein, the inorganic acid is sulfuric acid, hydrochloric acid, nitric acid or phosphoric acid (d) Charging cell stack 14: An external power supply 35 is connected to the positive electrode 24 and the negative electrode 25. A current of 1~2 amperes (A) is conducted under a constant-current mode with a cut-off voltage of 1.6 volts (V). Charging and discharging operations are processed in the cell stack 2 of a flow battery 3 and the charging and discharging operations are repeated until charge ends.

The present invention modifies carbon felts through sonication to efficiently generate —OH and C═O functional groups on surface defects of the carbon felts. The —OH and C═O functional groups catalyze redox reaction of vanadium ions. It means that, through an activation treatment, the carbon felts obtains more active positions to enhance valence exchange of vanadium ions and increase efficiency of the redox reaction. The general method of acid treatment needs to set up a reflux condenser with reaction time up to several hours or more. In contrast, the present invention is simple and uses sonication with no need for a high pressure environment. A plurality of 5 cm×5 cm carbon felts are immersed into a mixed acid solution having a volume ratio of 3:1 of sulfuric acid to nitric acid. Under a temperature of 70° C., the sonication is processed for 30, 60 and 90 min, respectively, followed by washing with ultrapure water and drying to be used for subsequent detection and cell testing.

Figure 4:
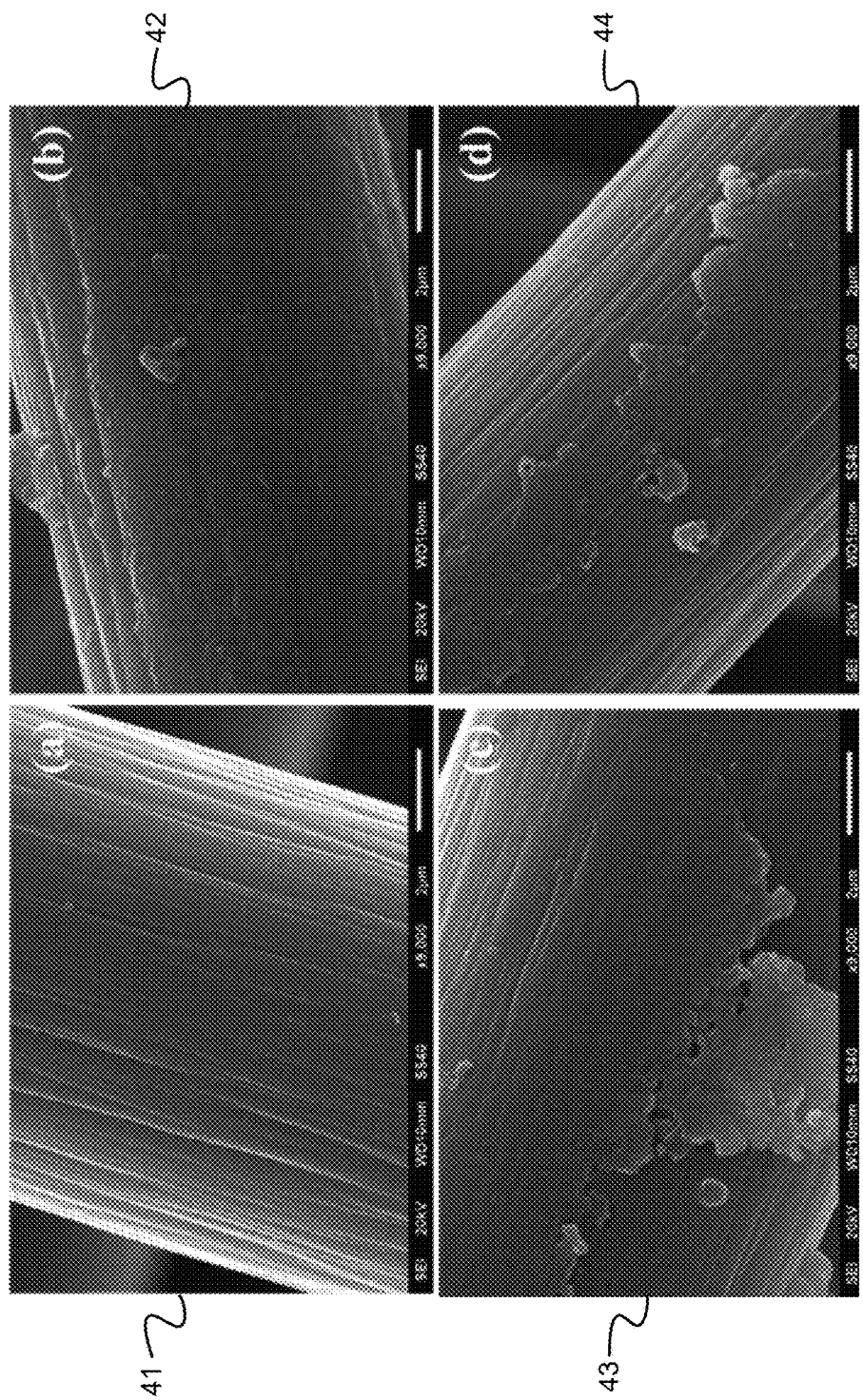
FIG. 4 is the SEM view showing the surfaces of the carbon felts.
Figure 5:
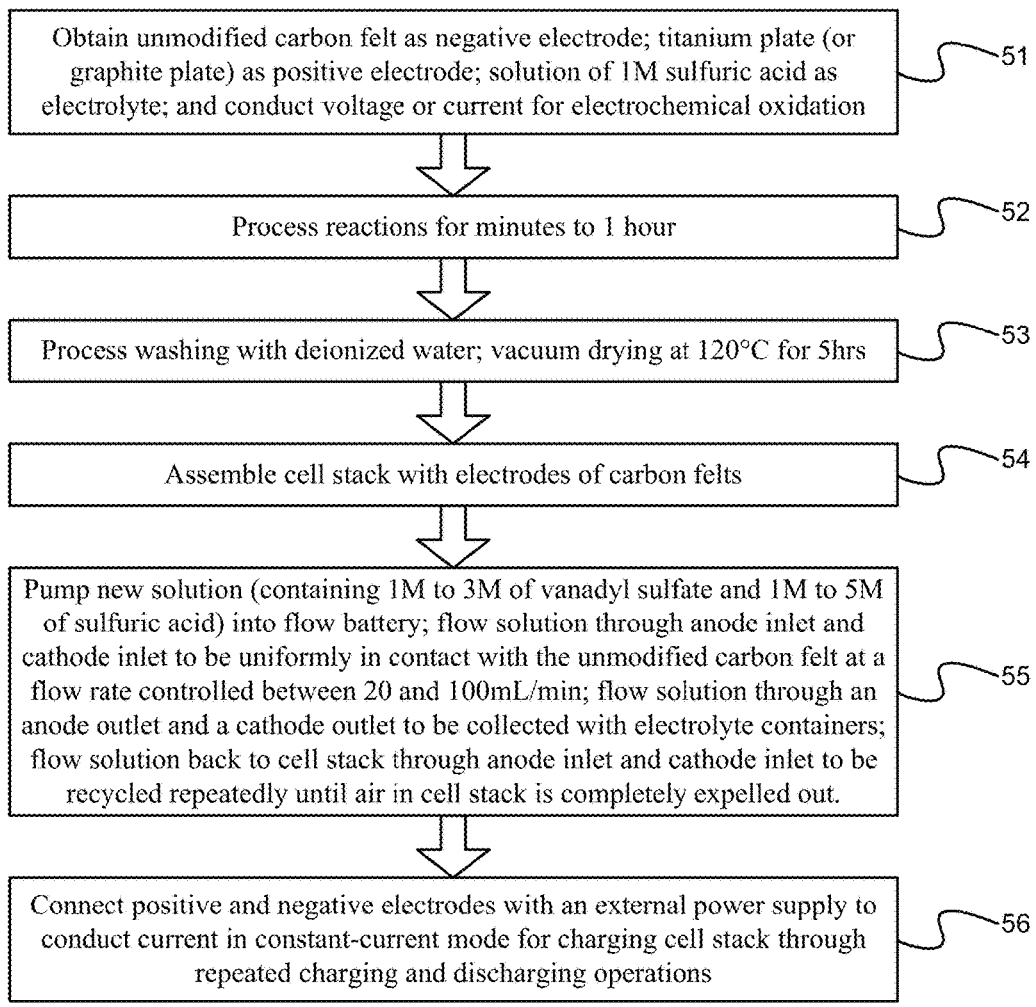
FIG. 5 is the view of the prior art.

A scanning electron microscope (SEM) is used to detect surfaces of the carbon felts. As shown in FIG. 4, the picture of notation 41 shows an unmodified carbon felt; and the other pictures of notation 42, 43 and 44 show modified carbon felts obtained through 30, 60 and 90 minutes of sonication, respectively. From the results, it is known that the surface of the unmodified carbon felt is smooth and the surfaces of the modified carbon felts become rougher and more uneven as the reaction time increases. Defects are generated on the surfaces of the modified carbon felts.

The above four carbon felts are examined. Nafion 117 is obtained as a proton exchange membrane. An industrial-grade vanadyl sulfate is obtained as an electrolyte, whose concentration is 1.6M. Under a flow rate of 50 mL/min, a current of 2 A is conducted in a constant-current mode with a cutoff voltage of 1.6V for charging and discharging a flow battery with the electrolyte. The charging and discharging operations keep repeating until charge ends. Table 1 shows a result obtained after 50 rounds of charging and discharging operations. It shows that the carbon felt modified through sonication for 60 min has the best voltage efficiency and energy efficiency, which obtains about 3% improvement as compared to the unmodified carbon felt. The results show that sonication with acid treatment can effectively modify carbon felts and significantly shorten reaction time, and thus enhance the overall energy efficiency of single cell.

TABLE 1

|  | Time | Coulomb efficiency | Energy efficiency | Voltage efficiency |
| --- | --- | --- | --- | --- |
| unmodified carbon felt |  | 94.89% | 76.30% | 80.41% |
| Sonication | 30 min | 95.80% | 78.08% | 81.51% |
| Sonication | 60 min | 95.96% | 80.14% | 83.51% |
| Sonication | 90 min | 96.40% | 77.38% | 80.28% |

Thus, the present invention directly immerses carbon felts in a mixed acid solution to be heated at a low temperature and processed through sonication for efficiently generating —OH and C=O functional groups on surface defects of the carbon felts. The —OH and C=O functional groups catalyze redox reaction of vanadium ions for obtaining more active positions on the carbon felts to enhance valence exchange of vanadium ions and increase efficiency of the redox reaction. Thereby, the present invention has simple and fast processes with easily regulated experimental parameters for good modification without high temperature treatment but with low cost.

To sum up, the present invention is a method of enhancing efficiency of carbon felts in a flow battery through sonication, where carbon felts are modified through sonication to generate —OH and C=O functional groups on surface defects of the carbon felts; and the present invention has simple and fast processes with easily regulated experimental parameters for good modification without high temperature treatment but with low cost.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of enhancing efficiency of carbon felts in a flow battery through sonication, comprising steps of:
   (a) immersing a plurality of carbon felts in a mixed acid solution; processing with heating and sonication; and, then, washing said carbon felts with ultrapure water and drying said carbon felts;
   (b) obtaining said carbon felts after being processed with said sonication to be made into a positive electrode and a negative electrode; and assembling a cell stack with said positive electrode and said negative electrode;
   (c) filling an electrolyte into said cell stack by two pumps, said electrolyte comprising 1 mole (M) to 3M of vanadyl sulfate and an aqueous solution of 1M to 5M of inorganic acid; under a flow rate controlled between 20 and 100 milliliters per minute (mL/min), flowing said electrolyte through an anode inlet and a cathode inlet to be uniformly in contact with said positive electrode and said negative electrode which are made of said carbon felts; flowing said electrolyte through an anode outlet and a cathode outlet and said anode inlet and said cathode inlet to be collected in a positive electrolyte container and a negative electrolyte container; recycling said electrolyte to be pumped into said cell stack again through said anode inlet and said cathode inlet until air in said cell stack is completely expelled; and
   (d) connecting an external power supply to said positive electrode and said negative electrode; conducting a current of 1~2 amperes (A) under a constant-current mode with a cut-off voltage of 1.6 volts (V); processing charging and discharging operations in said cell stack; and repeating said charging and discharging operations until charge ends.

2. The method according to claim 1, wherein, in step (a), said mixed acid solution has a volume ratio of 3:1 of sulfuric acid to nitric acid.

3. The method according to claim 1, wherein, in step (a), said heating is processed to a temperature of 55~85° C. and, then, said sonication is processed for 10~90 min.

4. The method according to claim 1, wherein, in step (b), said cell stack comprises
   a proton exchange membrane;
   two gaskets, said two gaskets clipping said proton exchange membrane;
   two electrodes, said two electrodes clipping said two gaskets, said two electrodes being said positive electrode and said negative electrode, said two electrodes being made of said carbon felt;
   two flow plates, said two flow plate clipping said two electrodes, one of said two flow plates having an anode inlet and a cathode inlet, another one of said two flow plates having an anode outlet and a cathode outlet; and
   two end plates, said two end plates clipping said two flow plates.

5. The method according to claim 1, wherein, in step (c), said inorganic acid is selected from a group consisting of sulfuric acid, hydrochloric acid, nitric acid and phosphoric acid.

* * * * *